(12) United States Patent
Kim et al.

(10) Patent No.: US 6,670,016 B1
(45) Date of Patent: Dec. 30, 2003

(54) HIGH DENSITY OPTICAL INFORMATION RECORDING MEDIUM

(75) Inventors: Won Mok Kim, Seoul (KR); Soon Gwang Kim, Koyang (KR); Byung Ki Cheong, Seoul (KR); Moon Kyo Chung, Seoul (KR); Taek Sung Lee, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 186 days.

(21) Appl. No.: 09/721,890

(22) Filed: Nov. 24, 2000

(51) Int. Cl.[7] .............. B32B 3/02; B32B 7/04; B32B 3/08; B32B 15/02

(52) U.S. Cl. ............ 428/64.4; 428/141; 428/156; 428/402

(58) Field of Search .............. 428/64.4, 141, 428/156, 402

(56) References Cited

U.S. PATENT DOCUMENTS

| 4,548,889 A | * 10/1985 | Nemoto et al. ............ 430/273 |
| 5,709,978 A | 1/1998 | Hirotsune et al. |
| 5,976,667 A | * 11/1999 | Hiroki ........................ 428/141 |

FOREIGN PATENT DOCUMENTS

| JP | 5-73961 | 3/1993 |

OTHER PUBLICATIONS

Kasami et al., J. Appl. Phys., 35, Part 1, No. 1B, 423–428 (Jan. 1999).

* cited by examiner

*Primary Examiner*—Cynthia H. Kelly
*Assistant Examiner*—L. Ferguson
(74) *Attorney, Agent, or Firm*—Scully, Scott, Murphy & Presser

(57) ABSTRACT

The present invention is related to a super-resolution composite material for a high density optical information recording medium which consists of a dielectric medium that is transparent at a laser wavelength in use and has a melting point higher than 800° C., and metal particles that are dispersed in the dielectric medium and have low melting points of 150~450° C. Super-resolution capability of the material is rendered by metal particles that undergo reversible phase changes between melt and crystalline states, accompanied by changes in optical properties. As the dielectric medium, at least one material is selected for use from the group of $SiO_2$, $TiO_2$, $ZrO_2$, $HfO_2$, $Al_2O_3$, ZnO, $Y_2O_3$, BeO, MgO, $WO_3$, $V_2O_3$, SiN, AlN, ZnS, CdS SiC, MgF, $CaF_2$, NaF, $BaF_2$, $PbF_2$, LiF, $LaF_3$, GaP. As the metal particles with low melting points and high boiling points, at least one material is selected for use from a group of Sn, Pb, Bi, Te, Zn Cd, Se, Tl and Po.

3 Claims, 3 Drawing Sheets

HIGH DENSITY OPTICAL INFORMATION RECORDING MEDIUM

BACKGROUND OF THE INVENTION

1. Field of the Invention

The present invention relates to a super-resolution material for an optical information recording medium, particularly to a super-resolution material of which a partial region under a focused laser beam changes to melt according to the temperature profile due to light absorption, so as to have different optical transmissivity and reflectivity from its adjacent region.

2. Description of the Background Art

Optical disks include a ROM (Read Only Memory) disk such as a CD-ROM or a DVD-ROM that is able to produce readout signals from pre-pits engraved on a substrate, a WORM (Write Once Read Many) disk that can be only read out once it is written, and a rewritable disk such as a magneto-optic disk that makes use of the Kerr rotation of a linear polarized beam varying with a magnetization direction of a recording film or a phase change optical disk that uses a reflectivity difference between a crystalline space and an amorphous mark on a recording film.

In the optical disk, the size of a focused laser beam to record or reproduce information is determined by the wavelength ($\lambda$) of a laser beam and numerical aperture (NA) of an objective lens, which is given by $\lambda$/NA at a diffraction limit.

For the focused beam at a diffraction limit, a minimum period of the recorded pattern that can be theoretically read out is given by $\lambda$/2NA. Accordingly, in order to accomplish a high density in an optical disk, the wavelength of a laser beam should be reduced, or the NA should be increased to reduce the size of the focused beam.

With the wavelengths of currently available semiconductor lasers limited to a visible ray regime, reduction of a focused beam size may rather be achieved by increase in NA. With an NA significantly greater than those currently used, a tilt margin and a spherical aberration margin of the disk become so small, causing a technical difficulty in designing an optical pick-up head. Furthermore, the conventional method of laser beam through 1.2 or 0.6 mm substrate needs be discarded, leading to the problem of lack of compatibility with the existing disks.

With respect to a ROM type optical disk as well as a rewritable phase change optical disk, another technical approach, so called super-resolution, may be employed to accomplish a high density. In this method, optical and thermal properties of a thin film layer of an optical disk are controlled to partially block the incident focused laser beam, thereby to give rise to an effect of reducing the beam size.

FIG. 1A schematically illustrates the concept of super-resolution for an optical disk, where a super-resolution layer 1 is irradiated with the beam spot 3 focused by the objective lens. FIGS. 1B and 1C show a Gaussian intensity profile 4 of a laser beam and the resulting temperature profile 5.

With reference to FIG. 1A, a portion 1a of the super-resolution layer 1 indicated by slanted lines has different optical properties from those of the rest due to the temperature profile resulting from laser beam irradiation. Since light transmission through the portion 1a is different from that of the adjacent region 1b, the size of the laser beam spot is reduced in effect to that of the portion with slanted lines.

For a successful application to an optical disk, the super-resolution material should satisfy several basic requirements as follows.

Firstly, the transmissivity and the reflectivity difference should be large between the region of changed optical properties and that of no change in optical properties under laser beam irradiation.

Secondly, the super-resolution material should have a high sensitivity to laser power so that optical properties can change as desired with a low laser power.

Thirdly, the material should not be deteriorated during repeated reproduction and/or recording of information.

Fourthly, the super-resolution material should have a fast response to laser beam irradiation in terms of change in optical properties.

Lastly, the material should restore promptly its initial state as laser beam moves away from the area under irradiation.

Conventionally, chalcogenide compounds such as GeSbTe and GeTe or pure metals such as In and Te have been used as super-resolution materials. In these materials, irradiation by a focused laser beam generates a temperature profile such that an area under the beam spot either melts or changes in crystal structure with concomitant changes in optical properties such as transmissivity and reflectivity.

However, a super-resolution material based on a crystal-to-melt transition has shortcomings such as material flow and compositional segregation during repeated readout processes of melting and recrystallization. Therefore, the super-resolution material is progressively degraded with repeated readout in terms of its performance, failing to serve the purpose any longer.

In an effort to overcome the deficiency, there has been proposed a method in which a small amount of a refractory metal or an alloy is added to the fusible matrix in order to suppress material flow by way of enhanced viscosity. Nevertheless, this method does not provide an ultimate solution.

With regard to a super-resolution material utilizing a crystal-to-crystal transition, on the other hand, it is not usually suitable for an optical information recording medium because of inherently slow kinetics of the transition.

SUMMARY OF THE INVENTION

An objective of the present invention is to provide a super-resolution material for an optical information recording medium which is capable of rendering a large difference in optical properties between a solid state and a melt state, suppressing material flow to reduce material degradation with repeated use, and generating a super-resolution function with a low laser power.

To realize these and other advantages and to achieve the purpose of the present invention as embodied and broadly described herein, there is provided a composite material thin film in which metal particles with low melting points such as Sn, In, Pb, Bi, Te, Zn Cd, Se, Tl and Po are embedded as dispersions in a dielectric medium such as $SiO_2$, $TiO_2$, $ZrO_2$, $HfO_2$, $Al_2O_3$, ZnO, $Y_2O_3$, BeO, MgO, $WO_3$, $V_2O_3$, SiN, AlN, ZnS, CdS SiC, $MgF$, $CaF_2$, NaF, $BaF_2$, $PbF_2$, LiF, $LaF_3$ or GaP that is transparent at a laser wavelength in use.

A high density optical information recording medium can be realized by use of a super-resolution layer that is able, in effect, to reduce the focused beam size owing to the characteristic that optical properties such as transmissivity and reflectivity of the composite material thin film change as the metal particles melt.

DETAILED DESCRIPTION OF THE PREFERRED EMBODIMENTS

The super-resolution technique of the present invention utilizes the phenomenon that a focused laser light absorbed by a super-resolution layer generates a temperature profile and the optical properties of a region at a higher temperature than a certain transition temperature (T') are different from those of a region at a lower temperature than it (T').

Figure 1A:
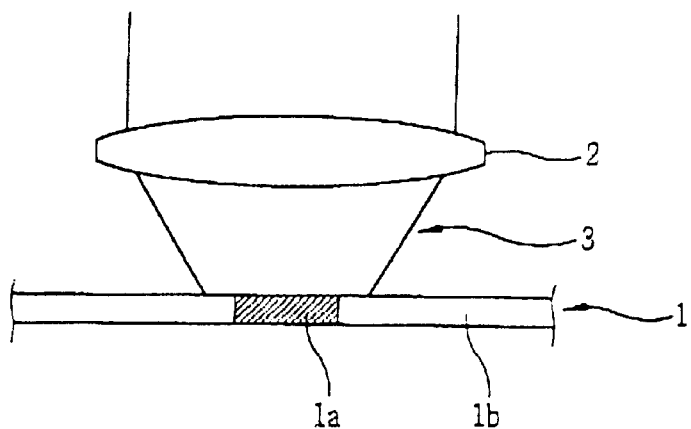
FIG. 1A is an explanatory schematic view of the concept of super-resolution for an optical disk in accordance with the conventional art.
Figure 1B:
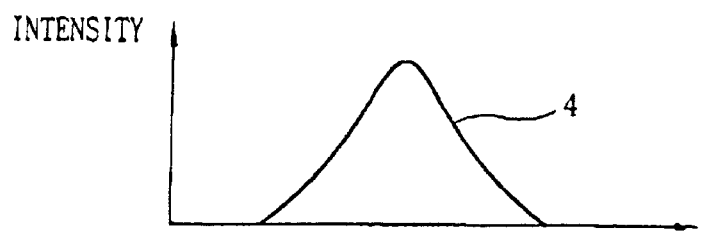
FIGS. 1B and 1C show a Gaussian intensity profile of a laser beam of FIG. 1 and a resulting temperature in accordance with the conventional art.
Figure 1C:
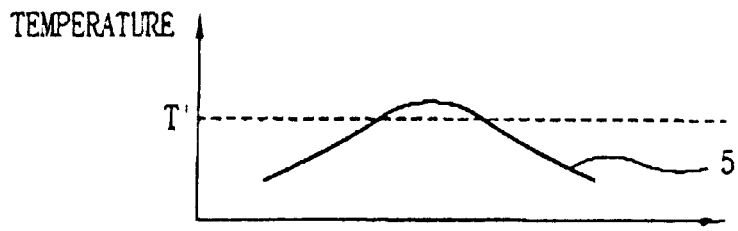
Figure 2:
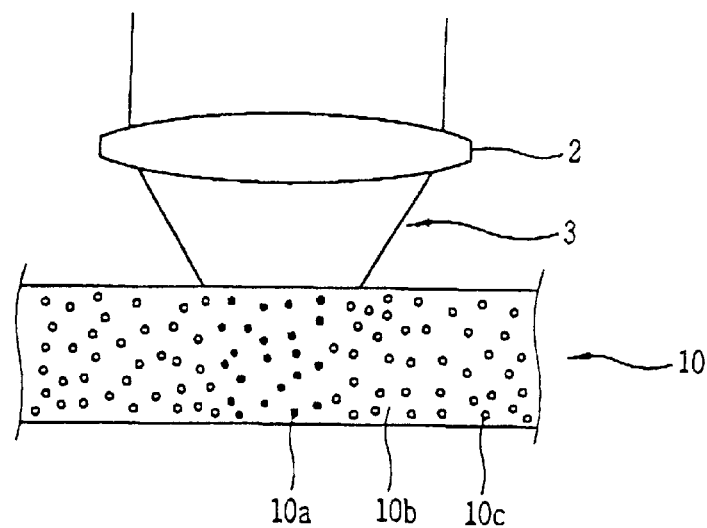
FIG. 2 is an explanatory schematic view of the concept of a super-resolution material in accordance with the present invention.
Figure 3:
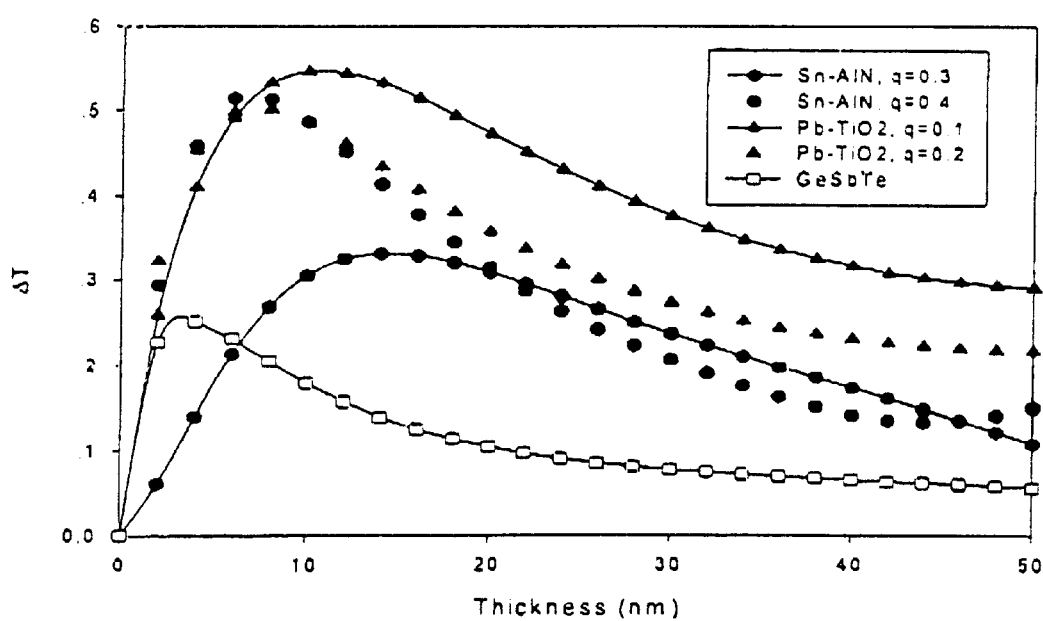
FIG. 3 is a graph showing transmittance difference between a case that the super-resolution material is in a melt-particle state and a case that the super-resolution material is in a crystal-particle state.

FIG. 2 is an explanatory schematic view of the concept of a super-resolution material in accordance with the present invention, and FIG. 3 is a graph showing transmittance difference between a case that the super-resolution material is in a melt-particle state and a case that the super-resolution material is in a crystal-particle state.

The super-resolution layer 10 consists of a composite material in which metal particles 10b and 10c with low melting points and high boiling points are dispersed in a dielectric medium 10a that is optically transparent at a laser wavelength in use and has a melting point higher than 800° C.

As the dielectric medium, at least one material is selected for use from $SiO_2$, $TiO_2$, $ZrO_2$, $HfO_2$, $Al_2O_3$, ZnO, $Y_2O_3$, BeO, MgO, $WO_3$, $V_2O_3$, SiN, AlN, ZnS, CdS SiC, MgF, $CaF_2$, NaF, $BaF_2$, $PbF_2$, LiF, $LaF_3$, GaP.

As metal particles with low melting points and high boiling points, at least one material is selected for use from Sn, Pb, Bi, Te, Zn Cd, Se, Tl and Po.

During irradiation of a laser beam on the super-resolution thin film, the metal particles 10b dispersed in the dielectric medium 10a absorb the light, leading to rise in temperature. When the temperature exceeds melting points of the dispersed metal particles, the super-resolution layer changes into a mixed state of the dielectric medium 10a and the melt metal particles 10b.

Since the melt metal particles 10b have different optical properties from those of the crystalline metal particles 10c, the super-resolution thin film undergoes a change in optical properties correspondingly.

As for the super-resolution material of the present invention, a crystal-to-melt transition is limited regionwise to the metal particles dispersed in the dielectric film that stays as a solid throughout the entire thermal history. Therefore, such degradation in super-resolution capability as in the conventional art due to material flow is suppressed in the present invention.

As another advantage, a low laser power is required to melt the metal particles since metals such as Sn, In, Pb, Bi, Te, and Zn or their alloys have low melting points.

It is widely known that thermal physical properties of a fine particle are different from those of a bulky particle. Specifically, melting point of a metal particle is known to become lowered with decrease in particle size. It was revealed from an actual measurement for 'In' particles dispersed in porous silica that melting point (in Kelvin scale) decreases inversely proportional to particle size. As an example, an 'In' particle of 5 nm in size was found to have a melting point of 111° C., which is 45° C. lower than the melting point of a bulk 'In' (156° C.). Therefore, a higher laser sensitivity is expected from a composite thin film having fine metal particles with low melting points dispersed on the dielectric matrix, as compared with a monolithic metal film.

The embodiment of the present invention and comparative examples will now be described in detail in light of the optical properties of the composite thin film, which is not limited thereto, however.

EXAMPLE 1

In this example, the optical properties of composite films, in which Sn and Pb were dispersed in dielectric medium of AlN and $TiO_2$, respectively, were explained and compared with that of materials used in the conventional art. The transmittance difference between melt state and crystalline state of dispersed metal particles was calculated with varying metal volume fraction (q) and plotted against the thickness of the film in FIG. 3. For comparison, the transmittance difference between the amorphous state and the crystalline state of GeSbTe, one of the super-resolution materials proposed in the conventional art was also shown in the drawing.

From the result as shown in FIG. 3, it is noted that the transmittance difference of the composite super-resolution thin film of the present invention is more than twice larger than that of the GeSbTe thin film in the conventional art.

Furthermore, unlike monolithic materials of which optical properties are fixed for a given state of materials, the composite material of the present invention can be advantageous in that the matrix, the dispersed material, and its quantity and particle size can be suitably adjusted to obtain a desired optical properties

EXAMPLE 2

Figure 4:
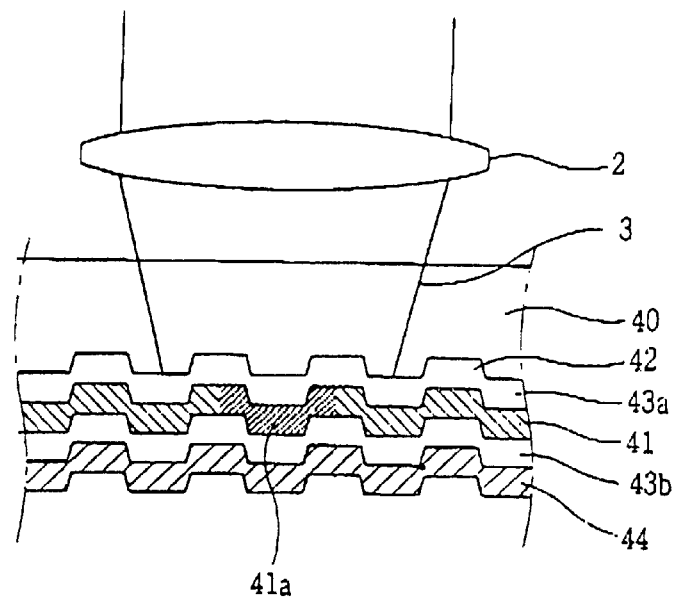
FIG. 4 is a schematic cross-sectional view of a ROM type optical disk using the super-resolution material in accordance with the present invention.

FIG. 4 is a sectional schematic view of a read-only optical disk(ROM) with the super-resolution material in accordance with the present invention, which has a multi-layer structure including a pre-fit 42 engraved on the surface of a substrate 40, a protective film 43a formed on the pre-fit, a super-resolution film 41 formed on the protective film 43a, a protective film 43b on the super-resolution film 41 and a reflection film 44 on the super-resolution film 43b.

In the case of ROM disk as depicted in FIG. 4, information is stored in the pre-pits 42 which were injection-molded on a transparent substrate such as polycarbonate, and a phase difference of the reflected beam resulted from the difference in depth between the pit and its adjacent portion produces a regenerative signal.

With reference to FIG. 4, when the focused laser beam is illuminated through substrate, the portion with slanted lines 41a of the super-resolution layer 41 within the focused laser beam spot 3 is melt, resulting in a different reflectivity from that of the adjacent crystalline portion. As for the ROM disk, the higher intensity of the reflected laser beam from the multi-layer structure gives the better signal quality. Therefore, in order for the media super-resolution to be applied successfully to the ROM disk, the absolute reflectivity should be high at the melt region of the super-resolution layer while the absolute reflectivity should be small in the adjacent portion which is in the crystalline state.

Table 1 shows comparisons of a reflectivity and a reflectivity difference between an optical information recording medium having a multi-layer structure fabricated by using the conventional super-resolution material and the optical information recording medium having a multi-layer structure fabricated by using the composite material of the present invention. The super-resolution layer 41 for each multi-layer stack had a thickness, at which the maximum transmittance difference between the melt state and crystalline state when used as a single layer. Aluminum alloy (Al—Cr) was used as a reflection film 43, and its thickness was fixed as 100 nm. ZnS—SiO$_2$ was used as the protective films 43a and 43b.

In Table 1, the reflectivity difference represents the maximum obtainable reflectivity difference between the melt state and the crystalline state with optimizing the thickness of the dielectric layer in the stack.

In case that the conventional super-resolution layer is adopted to the ROM disk, the maximum reflectivity differences were merely 29% and 15.4% at the wavelengths of 650 nm and 400 nm, respectively. On the other hand, in case of the super-resolution layer of the present invention, the reflectivity difference was more than 50% in each wavelength and the absolute reflectivity in the melt region was above 60%, which shows an excellent optical properties.

In addition, Table 1 also contains laser powers that are required for the melt region to have a size half the focused laser beam spot size 3. For this thermal simulation, the numerical aperture (NA) of the objective lens 2 of 0.6 and the linear velocity of 6 m/s were used. It is noted that the laser power making the size of the melt region to be half the size of the focused laser beam spot is below about 55% of the laser power of the super-resolution material of the conventional medium, having a highly improved sensitivity characteristic.

TABLE 1

| Super-resolution material | Thickness of each layer (protective layer/super-resolution layer/protective layer/reflection layer) | Wavelength (nm) | Reflectivity (%) | | | Laser power (mW) |
|---|---|---|---|---|---|---|
| | | | Melt region | Solid phase region | difference | |
| AlN—Sn | 116/6/20/100 | 650 | | 6.4 | 59.8 | 2.648 |
| GeSbTe | 52/4/64/100 | 650 | 38.8 | 9.8 | 29.0 | 4.902 |
| SiO2—Sn | 51/15/12/100 | 400 | 77.6 | 8.8 | 68.8 | 1.698 |
| GeSbTe | 122/15/51/100 | 400 | 25.4 | 10.0 | 15.4 | 3.152 |

EXAMPLE 3

Figure 5:
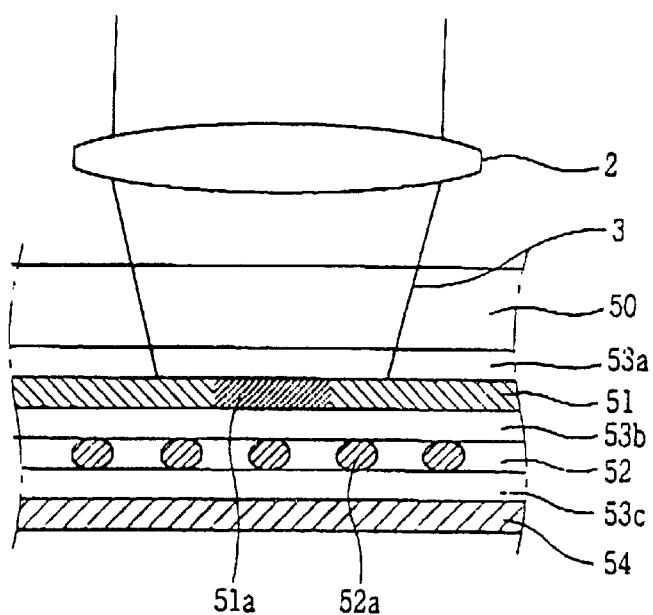
FIG. 5 is a schematic cross-sectional view of a rewritable phase-change optical disk using the super-resolution material in accordance with the present invention.

FIG. 5 is a sectional schematic view of a rewritable phase-change optical disk with super-resolution material in accordance with the present invention. The multi-layer structure includes a protective film 53a formed on a transparent substrate 50, a super-resolution film 51 formed on the protective film 53a, a protective film 53b formed on the super-resolution film 51, a recording layer 52 formed on the protective film 53b, a protective film 53c formed on the recording film 52 and a reflective film 54 formed on the protective film 53c, successively.

In the rewritable phase change optical disk, information is stored by forming the amorphous mark 52a on the crystalline state in the recording film 52, and the read-out signal is generated by the reflectivity difference between the amorphous recording mark 52a and its adjacent crystalline state. That is, as for the rewritable phase change optical disk, as the reflectivity difference between the amorphous state and the crystalline state is larger, the signal quality is better. Accordingly, in order for the super-resolution material to be adopted successfully to the rewritable phase change optical disk, the reflectivity difference between the amorphous recording mark and its peripheral crystalloid in the melt region of the super-resolution layer should be large, whereas the reflectivity difference between the amorphous recording mark and its peripheral crystalloid in the region, in which the super-resolution layer is not melt, should be small.

Table 2 shows comparisons of a reflectivity and a reflectivity difference between an optical information recording medium having a multi-layer structure fabricated by using the conventional super-resolution material and the optical information recording medium having a multi-layer structure fabricated by using the composite material of the present invention.

Aluminum alloy (Al—Cr) was used as a reflective film 54, and its thickness was fixed as 100 nm. The super-resolution layer 41 for each multi-layer stack had a thickness, at which the maximum transmittance difference between the melt state and crystalline state when used as a single layer. GeSbTe was used as the recording film layer 52 and its thickness was fixed as 10 nm, and ZnS—SiO$_2$ was used as the protective films 53a, 53b and 53c.

In the above Table 1, the reflectivity difference represents the maximum obtainable difference between the amorphous recording mark and the crystalline region when the super-resolution layer is in melt state, while satisfying less than 1% reflectivity difference between the amorphous recording mark and the crystalline region when the super-resolution layer is in solid state, by varying the thickness of the dielectric layers.

As shown in Table 2, at the wavelength of 650 nm, the super-resolution layer of the present invention increased the reflectivity difference in the melt region by 1.8% to that of the super-resolution of the conventional art, and in case of 400 nm, the reflectivity difference was increased as much as 12.4%. Table 2 also shows laser powers required for making the size of the melt region to be half of the size of the focused laser beam spot 3. The numerical aperture of the light-condensing lens 2 as used was 0.6 and the linear velocity was 6 m/s.

TABLE 2

| Super-resolution material | Thickness of each layer (protective film/super-resolution film/protective film/recording film/protective film/reflection film) | Wavelength (nm) | Reflectivity difference between amorphous recording mark and crystalline region (%) | | Laser power (mW) |
|---|---|---|---|---|---|
| | | | Melt region | Solid phase region | |
| AlN—Sn | 136/6//12/10/8/100 | 650 | 15.6 | 0.9 | 2.743 |
| GeSbTe | 182/4/88/10/48/100 | 650 | 13.8 | 0.7 | 5.517 |

TABLE 2-continued

| Super-resolution material | Thickness of each layer (proticeive film/super-resolution film/protective film/recording film/protective film/reflection film) | Wave length (nm) | Reflectivity difference between amorphous recording mark and crystalline region (%) | | Laser power (mW) |
|---|---|---|---|---|---|
| | | | Melt region | Solid phase region | |
| $SiO_2$—Sn | 133/15/21/10/12/100 | 400 | 21.1 | 0.5 | 1.242 |
| GeSbTe | 119/15/57/10/12/100 | 400 | 8.7 | 0.7 | 4.360 |

As shown in Table 2, the super-resolution material of the present invention has a laser sensitivity that is improved by double that of the conventional art.

As so far described, the super-resolution material in the form of composite thin film in which the metal particles with low melting points are dispersed in the dielectric medium, when applied to the ROM disk, the WORM disk and rewritable phase change optical disk, can give excellent optical properties compared to the super-resolution materials of the conventional art. In addition, the laser power sensitivity can be increased in reproducing the signal and the damage to the material due to the repeated use can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A super-resolution composite material for a high density optical information recording medium comprising a dielectric medium transparent at a wavelength of a laser beam in use, said dielectric medium having a melting point above 800° C. and being at least one material selected from the group consisting of $SiO_2$, $TiO_2$, $ZrO_2$, $HfO_2$, $Al_2O_3$, ZnO, $Y_2O_3$, BeO, MgO, $WO_3$, $V_2O_3$, SiN, AlN, ZnS, CdS, SiC, MgF, $CaF_2$, NaF, $BaF_2$, LiF, $LaF_3$ and GaP; and metal particles dispersed therein, said metal particles having melting points of about 150° to about 450° C., wherein said metal particles are at least one material selected from the group consisting of Sn, Pb, Bi, Te, Zn, Cd, Se, Tl, and Po, said composite material when irradiated by said laser beam comprises molten regions of said metal particles and a solid phase region of said dielectric medium in an area where temperatures exceed said melting points of said metal particles, each of said molten regions being restored to a solid state as said laser beam moves away from said irradiated area.

2. A ROM type optical information recording medium with pre-pits on a transparent substrate and a multilayer structure that includes a super-resolution layer, thereon, said super-resolution layer is made up of the material according to claim 1.

3. A rewritable optical information recording medium having, on a transparent substrate, a multi-layer structure that includes a recording layer as well as a super-resolution layer, said super-resolution layer is made up of the material according to claim 1.

* * * * *